United States Patent [19]

Hyland

[11] Patent Number: 4,571,664
[45] Date of Patent: Feb. 18, 1986

[54] SOLID ELECTROLYTE CAPACITOR FOR SURFACE MOUNTING

[75] Inventor: William J. Hyland, North Palm Beach, Fla.

[73] Assignee: Mepco/Electra, Inc., New York, N.Y.

[21] Appl. No.: 670,088

[22] Filed: Nov. 9, 1984

[51] Int. Cl.[4] .............................................. H01G 9/00
[52] U.S. Cl. ...................................... 361/433; 29/570
[58] Field of Search ........................... 361/433; 29/570

[56] References Cited

U.S. PATENT DOCUMENTS 3,855,505  12/1974  Karlik, Jr. et al. ................. 361/433
4,166,286  8/1979  Boissonnault ....................... 361/433

Primary Examiner—L. T. Hix
Assistant Examiner—Douglas S. Lee
Attorney, Agent, or Firm—Norman N. Spain

[57] ABSTRACT

A solid electrolyte chip capacitor having a conductive cathode coating, a coated and plated conformal cathode termination and an anode termination clip providing a thin-walled conformal construction with opposed termination connections on a base for surface mounting.

8 Claims, 2 Drawing Figures

SOLID ELECTROLYTE CAPACITOR FOR SURFACE MOUNTING

BACKGROUND OF THE INVENTION

1. Field of the Invention

This invention pertains to solid electrolyte chip capacitors particularly useful in thick and thin film hybrid circuitry and surface mounted devices technology. Such components must have a small size, high volumetric efficiency, compatibility with automatic component placement equipment for surface mounting and the high temperatures encountered with reflow soldering. The invention is directed in particular to maximizing the volumetric efficiency while minimizing the manufacturing cost of such a device.

2. Description of the Prior Art

Solid electrolyte chip capacitors in the prior art have utilized solid tantalum capacitor bodies with various means for forming conductive terminations to provide polarized devices. Four principal types of construction of chip solid electrolyte capacitors are known in the prior art. The T-bar construction is least expensive to manufacture and offers reasonable volumetric efficiency. It sacrifices efficiency in surface area on a PC board, is fragile and is not easily adaptable to automatic handling in placement. An alternative metal case T-bar suffers from decreased volumetric efficiency, decreased surface area efficiency and high manufacturing costs. Molded solid electrolyte capacitors offer reasonable efficiency in surface area but have the poorest volumetric efficiency. Molded capacitors tend to be dimensionally uniform and mechanically protected but they are sensitive to silver scavenging and offer poor packaging efficiency. However, they are well adapted to mechanized manufacture and to automatic placement equipment.

Conformal coated solid electrolyte chip capacitors offer the best volumetric efficiency, the best efficiency in use of surface area on a substrate or PC board and are mechanically protected. They are also insensitive to silver scavenging and some, such as that disclosed in U.S. Pat. No. 3,855,505, are very reliable through thermal stressing. Furthermore, the conformally-coated capacitors with metal end cap terminations (U.S. Pat. No. 3,855,505) are the best adaptable to automatic placement and are adaptable to the various surface mounting methods presently known. The major drawback of the conformal-coated capacitor is its high manufacturing cost. The provision of metal end cap terminations for these capacitors is labor-intensive. In the case of plated end caps, ESR may be a problem at the positive end. The required precision of the plated pads and the uniformity of length of the units are not dimensionally stable. These units are difficult to use with automatic surface mounting equipment.

The present invention has for its object the cost-effective manufacture of a solid electrolyte chip capacitor for automatic surface mounting which incorporates advantages found in various types of conformally-coated chip capacitors in the prior art while eliminating the various disadvantages thereof and achieving a reduction in the cost of manufacture of such capacitors.

SUMMARY OF THE INVENTION

A low cost solid electrolyte chip capacitor has a porous valve metal anode, usually of tantalum, and anode riser wire of the same valve metal extending from one end face. The sides and opposite end face are associated with a cathode connection. At least one side face is contiguous with the end faces. A conductive counter-electrode layer overlies the solid electrolyte in a region over the side faces and extends over the cathode end face. To this point the construction is conventional. The capacitor body is then coated with an insulating substance to seal the entire capacitor body, except the cathode end face and a portion of the base side which will serve as a surface mounting termination. Optionally a second conductive coating may be applied, coextensive with the first. The entire assembly up to the anode end face is plated with nickel. The nickel plating is coextensive with and covers the entire conductive counter-electrode layer, or layers, which usually comprise a silver loaded epoxy. The total plated area is the cathode conductor. The area that is to become the cathode (negative) termination is masked off and then the remaining area of the capacitor body is sprayed with an insulative coating. An L-shaped conductive anode end cap is positioned such that one leg is welded to the anode riser wire and the other leg is directly under the riser wire, spaced apart from the anode end. A nonconductive material is applied to the interior space between the anode end cap and the capacitor body.

After solder dipping, the chip capacitor has a conductive cathode end cap of solder-coated nickel formed directly over and in contact with the nickel-plated areas masked off during the insulation spraying, forming an L-shaped negative termination. Since the anode termination is also L-shaped, the chip has a symmetrical shape for surface mounting.

In the batch production of the capacitors of this invention, a plurality of porous tantalum anode bodies are attached to a metal carrier bar by welding each anode riser wire thereto and subsequently welding a lead frame to the capacitor bodies. All of the subsequent process steps are executed in batch fashion prior to singulating the finished capacitors from the bar. A portion of the lead frame becomes the anode terminal clip.

DESCRIPTION OF THE PREFERRED EMBODIMENT

Figure 1:
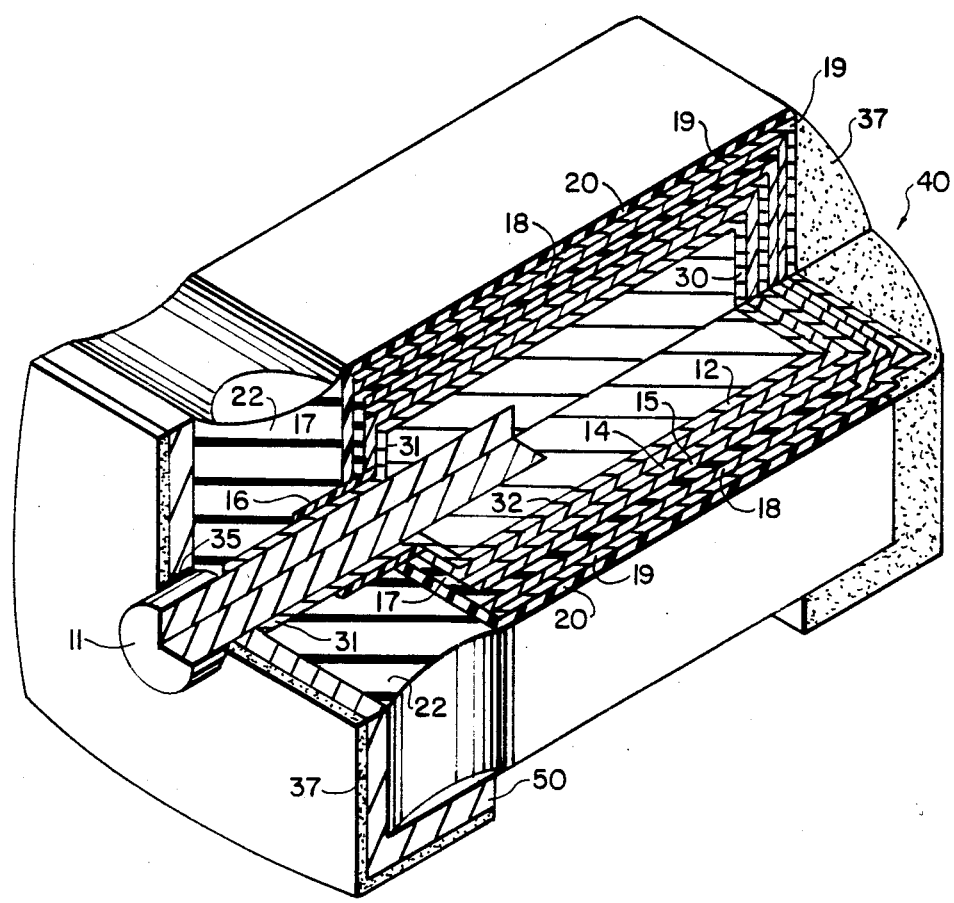
FIG. 1 is a partially cut away side perspective view of the solid electrolyte chip capacitor of the present invention.
Figure 2:
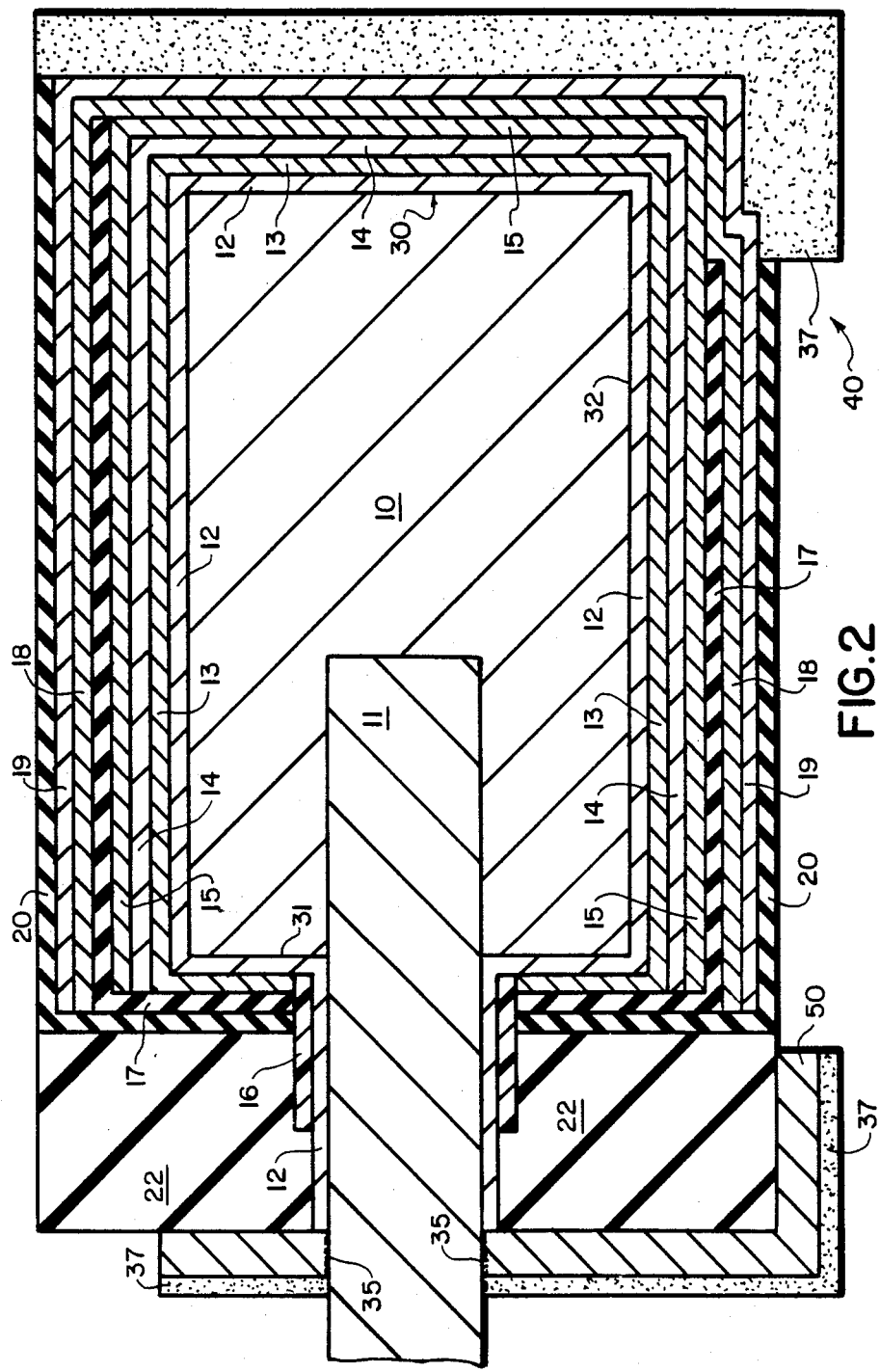
FIG. 2 is a cross-sectional view of the chip capacitor of FIG. 1.

A preferred embodiment of the present invention is shown in the figures. A porous tantalum anode 10 has a tantalum riser wire 11 partially embedded therein and extending from one end thereof. A dielectric film of tantalum pentoxide 12 is grown over the surfaces of the anode body 10 including those of the porous anode interstices. The anode riser wire receives an insulative coating 16. A solid electrolyte 13, preferably manganese dioxide, is disposed over the surfaces of the dielectric film 12, again including the subsurfaces within the interstices. The electrolyte and the dielectric 12 are shown schematically as only being on the outer surfaces of the anode 10 for pictorial clarity.

A conductive counter-electrode overlies the solid electrolyte 13, this electrode preferably being composed of a first sublayer 14 of graphite or carbon, and an overlayer 15 of metal particles in a binder. In the preferred embodiment, this overlayer 15 is a silver epoxy or a polyester. The counter-electrode coating will preferably cover the sides and the end face 30 opposite the anode riser wire to help seal the easily reducible manganese dioxide 13, but will not cover the anode end face 31 having the anode riser wire 11 which is suitably insulated therefrom. It is desirable that the counter-electrode overlies substantially all of the side faces of the capacitor body and the counter-electrode must extend over the end face 30 opposite the riser wire to obtain a capacitor having a minimum dissipation factor.

FIG. 1 is intended to represent a rectangular capacitor body, oriented for surface mounting on the lower side 32. It should be understood that a cylindrical body may be employed as well, with appropriate modifications.

The solid electrolyte chip capacitor described so far is well known in the prior art, as are the various techniques for its manufacture. The novelty of the present capacitor results from the subsequent processing described hereinafter. The entire capacitor body is then coated with an insulating and sealing material 17, which material is subsequently removed from the L-shaped cathode termination area 30, 40. For efficiency, this coating 17 is preferably the same epoxy as that used in the previous conductive coating, omitting the metallic component. A second conductive coating 18 is then applied coextensive with the first conductive coating, that is over the sides and cathode end. In some constructions, the second conductive coating may be omitted. The entire capacitor body except the anode end face 31 is then plated with nickel 19, including the counter-electrode base 30 and all sides of the capacitor body. This nickel plating is coextensive the entire conductive coatings previously applied and serves to protect the entire capacitor body from contaminants and silver migration by its total metal encapsulation. It also provides a continuous conductive path for the counter-electrode.

The nickel plating provides a device resistant to all known cleaning methods and solutions, and prevents the entrance of any contaminants into the active device elements. The nickel plate also provides the necessary strength to maintain encasement integrity through thermal shock. The nickel plated device will survive thermal shock as delineated in Mil-Std-833, method 1011.1, condition C.

An insulative organic coating 20 is sprayed over the nickel plating on substantially all of the side faces of the capacitor body, with the exception of the mounting surface 50, 40, and over the anode end face 31, while essentially not covering the cathode end surface 30 and mounting surface 40 which are masked from this spray. Preferably, this spray coating is a fluorocarbon. The nickel-plating and the fluorocarbon/epoxy coatings provide total chip encapsulation. The total thickness of these coatings is approximately 0.001".

To provide the anode end cap 50, an L-shaped lead frame is welded 35 to the anode riser wire 11 at a slight distance from the anode end face 31 of the capacitor body. After this a portion of the lead frame is then broken away, leaving the L-shaped end cap 50 welded to the riser wire 11 of each chip. The space between the anode end face 31 and the end cap 50 is back-filled with a curably epoxy 22.

An L-shaped cathode termination 30, 40 is finished by solder-coating the nickel-plated cathode end termination 30 and the mounting surface 40. In the coating process, as the cathode end 30 is dipped the solder will rise above the end 30 of the capacitor up the exposed nickel-plated side wall 40 thereof, which forms mounting surface 40. This additional bulk will offset the thickness of the base leg of the L-shaped anode terminal cap 50 so that when the base leg of the L-shaped anode end cap 50 is flush to the surface of a PC board, the solder-coated nickel negative termination 40, which is also L-shaped, is flush with the surface of the PC board.

A gold plating of the terminations may be utilized in place of the solder.

The capacitor is now essentially complete for use.

The combination plating and insulating spray preserves the rectangular shape of the underlying anode and maximizes the flatness of the surfaces. The thin-walled protection system of this construction provides volumetric efficiency and reduces the surface area required on a substrate or PC board. It is the most efficient system for protectively coating devices known. This becomes more important as finished device sizes shrink, since the percentage of the finished device consumed by coatings increases with reduced device size. Other methods of containment such as dip and electrostatic coating are much thicker and produce rounded surfaces. For the high speed, reliable pick and place of components by vacuum probe required in surface mounting technology, the flatness and uniformity of the chip surface is required.

The capacitors of the present invention may be made by a batch-processing method. In the batch method, a plurality of capacitor bodies having anode wires extending therefrom are attached to a bar by welding the ends of the anode wires to said bar. A plurality of these bars are placed on a rack. All the subsequent processing steps then take place while the individual capacitor bodies are attached to that bar. Many of these steps are known in the prior art and need not be discussed here.

The method of the present invention uses conventional processing steps up through the first conductive coating, the silvered capacitor body. The encapsulation of the capacitor body deviates from prior art processing methods. In a first step, the entire capacitor body is dipped in an insulative sealant, preferably the same epoxy used in applying the first conductive coating. A second conductive (silver) coating is then applied by dipping the capacitor body up to the edge of the anode end in a silver adhesive. The purpose of this additional coating in conjunction with the insulative sealer is to seal the capacitor body for plating with electroless nickel. Other metals may be utilized in the conductive coating and plating steps.

The entire silver-coated portion of the capacitor body is then electrolessly plated with a layer of nickel to provide a continuous conductive path and to provide a total metal encapsulation. This provides both a capacitor body that is free from possible contamination and one which is free from breaks in electrical conductivity. A second insulative spray coating is applied to the sides of the capacitor body, except for mounting surface 40 and the conductive end 30, these areas being masked. The purpose of the coating is to insulate and seal the capacitor body. At this point the capacitor body is ready for the anode terminal clip 50. The anode terminal clip is a portion of an L-shaped lead frame which is first welded 35 to the anode riser wires 11 of a batch such that the L-shaped clip is spaced apart from the anode end face. The individual capacitors are singulated by cutting the lead frame on each side of the capacitor body so that the lead frame is flush with the capacitor body. Following singulation, the space between the L-shaped termination and the rest of the body is filled with an epoxy which is cured to provide a secure bond, giving the capacitor form and strengthening the weld site. Following epoxy backfill the device may be given a polarity indicator by placing a red ink dot on the backfill adjacent to the weld. The batch is then solder dipped or gold plated to provide a useful surface on the terminations. The anode risers are then cut and the individual capacitors are ready for testing and packaging.

I claim:

1. An improved solid electrolyte chip capacitor for surface mounting comprising a porous valve metal anode with one end face from which a wire of said valve metal extends; an opposite end face and at least one side face contiguous with said end faces; a dielectric film formed over the surfaces of said porous anode; an insulative coating covering said wire in proximity to said end face; a solid electrolyte over said dielectric film; a first conductive counter-electrode coating overlying said solid electrolyte over all surfaces of said solid electrolyte except said end face from which said wire extends, and extending over said opposite end face; the improvement comprising:

an insulative sealing coating applied to said entire capacitor body except for said opposite end face and a portion of one side contiguous to said opposite end face;
   a second conductive coating applied over said insulative sealing coat coextensive with said first conductive coating;
   a nickel-plated layer over said second conductive coating and coextensive therewith;
   a second insulative coating covering said capacitor body except said opposite end face and a portion of said side contiguous with said opposite end face;
   an L-shaped conductive end cap secured to said wire, spaced apart from said one end face and extending under said wire;
   an insulative filler securing said end cap to said one end face; and
   a solder coating on both conductive ends of said capacitor body.

2. An improved solid electrolyte chip capacitor having an anode body made of a valve metal and having a stem of the same material extending from one face thereof, a dielectric oxide coating formed over the surface of said anode body, an insulative coating on said stem, a solid electrolyte layer formed over the oxide except on said end stem and separated from said stem by said insulative coating, a conductive coating formed over said electrolyte except on said end face from which said stem protrudes wherein the improvement comprises:

one face of said capacitor body opposite to said anode end face and a portion of one side contiguous to said opposite end face serving as a cathode termination area;
   a sealing insulative coating covering substantially all of said capacitor body except said cathode termination area;
   a second conductive coating covering all of said capacitor body except the end face from which said stem protrudes;
   a conductive metal plated over said second conductive coating;
   an insulative sealing coating applied to substantially all of said capacitor body except over said cathode termination area;
   an L-shaped end cap having a base leg spaced from the anode end of said capacitor body;
   means forming an opening in one leg of said end cap, said stem extending into said opening and being electrically connected thereto;
   an insulating substance back filled between said anode end cap and said capacitor body encapsulating said stem;
   a solder coating over said anode end cap and said cathode termination area.

3. An improved electrolytic tantalum capacitor having a conventional solid tantalum capacitor body whose shape is a right parallel pipe having four sides, a cathode end and an anode end, an anode lead wire attached to said body at said anode end, an insulative coating on said anode lead wire, a conductive coating covering said cathode end and said four sides, wherein the improvement comprises:

a sealing insulative coating covering said anode end, three of said sides and a portion of a fourth side designated as a base side for surface mounting, said sealed portion being contiguous to said cathode end;
   a second conductive covering applied over said four sides and said cathode end;
   a third conductive coating in the form of a plating over said second conductive coating;
   a second insulative sealing coating over said first insulative sealing coating;
   said cathode end and said unsealed portion of said base side contiguous thereto forming an L-shaped cathode termination;
   an L-shaped anode termination means having one leg electrically connected to said anode wire and the other leg positioned under said anode wire on the anode end of said base side;
   an insulative material filling the space between said anode termination means and the anode end of said capacitor body;
   a solder coating on said L-shaped anode termination and said L-shaped cathode termination such that the portions of said terminations on said base side of said capacitor body are in the same plane for surface mounting.

4. A method for manufacturing an improved solid electrolyte chip capacitor for surface mounting which capacitor comprises a porous valve metal anode with one end face from which a wire of said metal extends, an opposite end face and at least one side face contiguous with said end faces; a dielectric film formed on the surfaces of said porous anode, a first insulating coating covering said wire in proximity to said end face from which said wire extends, a solid electrolyte layer formed on said dielectric film, a first conductive counter-electrode coating overlying said solid electrolyte layer over all surfaces of said solid electrolyte layer except for said end face from which said wire extends and extending over said opposite end face, said method comprising:

applying a second insulating coating and sealing layer to said capacitor body except for said opposite end face and a portion of said side face contiguous to said opposite end face;
   applying a nickel layer on said second insulating coating and coextensive therewith;

aplying an additional insulating coating on said capacitor body except on said end faces, the portions of each side face contiguous to said faces; and soldering an L-shaped conductive end cap to said wire in a manner such that said end cap is spaced apart from said one end face from which said wire extends and extends under said wire;

and applying an insulating filler from said end cap to said one end face thereby securing said end cap to said one end face.

5. A method for manufacturing an improved solid electrolyte chip capacitor for surface mounting which capacitor comprises a porous valve metal anode with one end face from which a wire of said metal extends, an opposite end face and at least one side face contiguous with said end faces; a dielectric film formed on the surfaces of said porous anode, a first insulating coating covering said wire in proximity to said end face from which said wire extends, a solid electrolyte layer formed on said dielectric film, a first conductive counter-electrode coating overlying said solid electrolyte layer over all surfaces of said solid electrolyte layer except for said end face from which said wire extends over said opposite end face, said method comprising: p1 applying a second and sealing insulating coating to said capacitor body except for said opposite end face and a portion of said side face contiguous to said oposite end face;

applying a second conductive coating on said second insulating coating coextensive with said first conductive coating;

applying a nickel layer on said second conductive coating and coextensive therewith;

aplying an additional insulating coating on said capacitor body except on said end faces and the portions of said side faces contiguous to said end faces;

soldering a L-shaped conductive end cap to said wire in a manner such that said end cap is spaced apart from said one end face from which said wire extends and extends under said wire;

and applying an insulating filler from said end cap to said one end face thereby securing said end cap to said one end face.

6. The method of claim 5 wherein the second and additional insulating coatings are formed by spray coating.

7. The method of claim 5 wherein the second conductive coating is a silver coating.

8. The method of claim 5 wherein the nickel layer is formed by electroless plating.

* * * * *